United States Patent
Paul et al.

(10) Patent No.: US 9,637,237 B2
(45) Date of Patent: May 2, 2017

(54) FILTER GRANULATE

(71) Applicant: Lufthansa Technik AG, Hamburg (DE)

(72) Inventors: Manfred Paul, Nackenheim (DE);
Robert Sweredjuk,
Dietmannsried-Reicholzried (DE);
Rainer Pommersheim, Mainz (DE)

(73) Assignee: Lufthansa Technik AG (DE)

( * ) Notice: Subject to any disclaimer, the term of this patent is extended or adjusted under 35 U.S.C. 154(b) by 1073 days.

(21) Appl. No.: 13/765,808

(22) Filed: Feb. 13, 2013

(65) Prior Publication Data

US 2013/0252526 A1    Sep. 26, 2013

(30) Foreign Application Priority Data

Feb. 20, 2012    (DE) .................. 10 2012 202 563

(51) Int. Cl.
| | | |
|---|---|---|
| *B64D 13/02* | (2006.01) | |
| *B64D 13/08* | (2006.01) | |
| *B01D 53/02* | (2006.01) | |
| *B01J 20/24* | (2006.01) | |
| *B64D 13/06* | (2006.01) | |

(52) U.S. Cl.
CPC ............ *B64D 13/02* (2013.01); *B01D 53/02* (2013.01); *B01J 20/24* (2013.01); *B64D 13/08* (2013.01); *B01D 2252/30* (2013.01); *B01D 2253/25* (2013.01); *B01D 2258/06* (2013.01); *B01D 2259/4575* (2013.01); *B64D 2013/0651* (2013.01); *Y10T 428/2982* (2015.01)

(58) Field of Classification Search
CPC ........ B01D 53/02; B01D 53/04; B01D 53/14; B01D 2252/30; B01D 2253/25; B01D 2257/702; B01D 2259/4575; B64D 13/00; B64D 13/02; B64D 13/08; B01J 20/24
See application file for complete search history.

(56) References Cited

U.S. PATENT DOCUMENTS

| | | | |
|---|---|---|---|
| 4,389,419 A | 6/1983 | Lim et al. | |
| 5,302,354 A * | 4/1994 | Watvedt ............... | B01D 46/002 96/134 |
| 5,863,310 A * | 1/1999 | Brown ............... | B01D 46/0005 454/284 |
| 2001/0002386 A1 | 5/2001 | Steele et al. | |
| 2002/0170436 A1 * | 11/2002 | Keefer .................. | B01D 53/02 96/121 |
| 2003/0188850 A1 | 10/2003 | Liu et al. | |

(Continued)

FOREIGN PATENT DOCUMENTS

| | | |
|---|---|---|
| DE | 19745191 | 4/1999 |
| DE | 19901049 | 7/2000 |

OTHER PUBLICATIONS

English Abstract of DE 19745191, published Apr. 15, 1999.
English Abstract of DE 19901049, published Jul. 20, 2000.

*Primary Examiner* — Jason M Greene
(74) *Attorney, Agent, or Firm* — Casimir Jones, S.C.; Mary Ann Brow

(57) ABSTRACT

The invention relates to a filter granulate for binding constituents of a gas flow.
The invention furthermore relates to the use of such a filter granulate for filtering the breathing air in means of transport, more particularly aircraft, as well as to an aircraft equipped with a filter comprising a filter granulate according to the invention.

20 Claims, 1 Drawing Sheet

(56) References Cited

U.S. PATENT DOCUMENTS

| | | | |
|---|---|---|---|
| 2004/0211161 A1* | 10/2004 | Avery | B64D 13/00 55/385.1 |
| 2005/0053515 A1* | 3/2005 | Yates | B01D 53/04 422/4 |
| 2005/0092176 A1* | 5/2005 | Ding | B01D 53/02 95/90 |
| 2007/0123660 A1* | 5/2007 | deGouvea-Pinto | B01D 53/64 525/342 |
| 2008/0184886 A1* | 8/2008 | Tufts | B01D 53/02 95/148 |
| 2009/0227195 A1* | 9/2009 | Buelow | B64D 13/00 454/156 |
| 2010/0140175 A1* | 6/2010 | Wyse | B01D 53/1493 210/660 |
| 2010/0158775 A1 | 6/2010 | Galligan et al. | |
| 2012/0132851 A1* | 5/2012 | Blanchard | B01D 53/02 252/182.12 |
| 2013/0109074 A1* | 5/2013 | Aines | B01D 53/14 96/234 |
| 2013/0280151 A1* | 10/2013 | Lee | B01D 53/02 423/226 |

\* cited by examiner

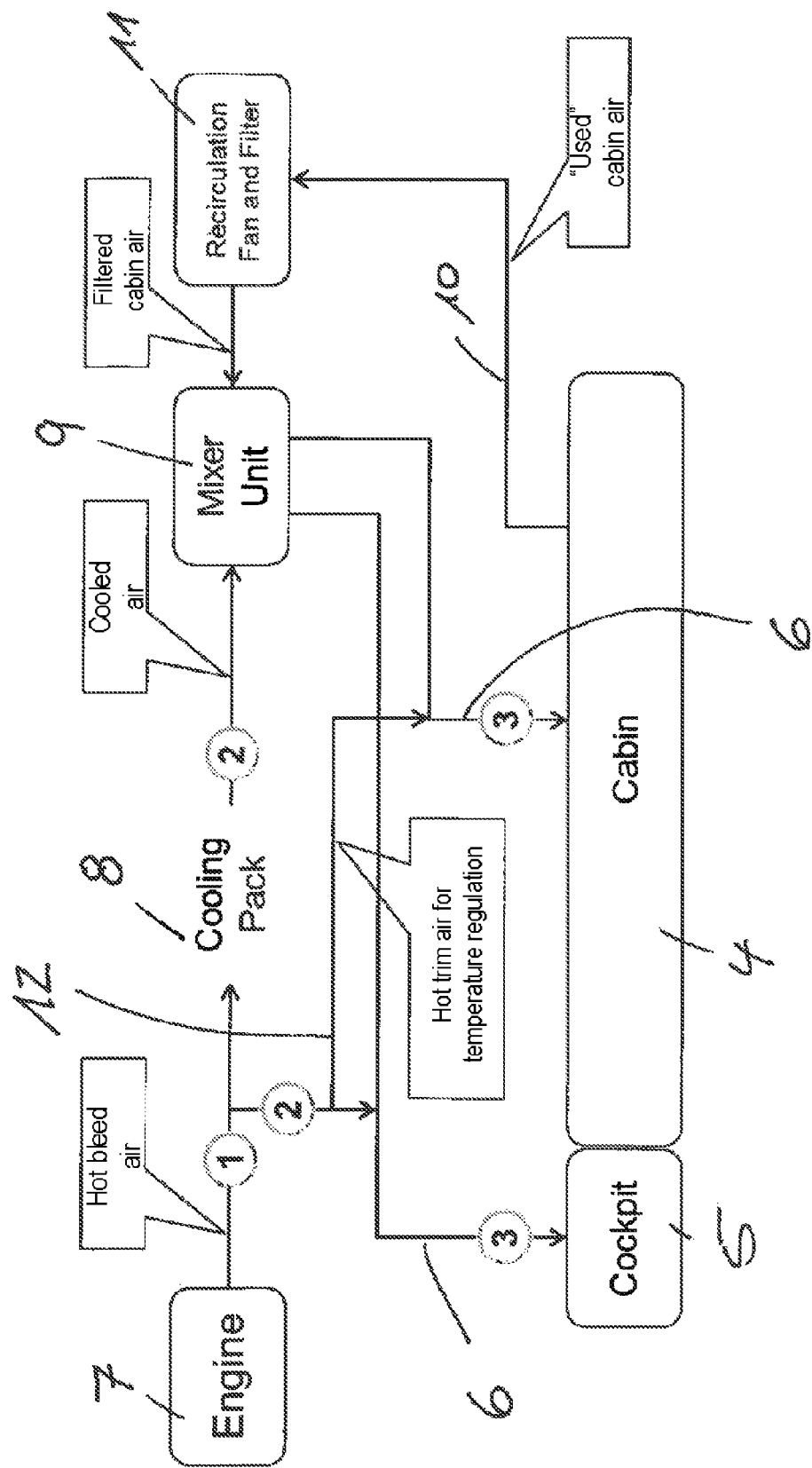

FILTER GRANULATE

This application claims priority to German Patent Application 10 2012 202 563.4, filed Feb. 20, 2012.

The invention relates to a filter granulate for binding constituents of a gas flow. The invention furthermore relates to the use of such a filter granulate for filtering the breathing air in means of transport, more particularly aircraft, as well as to an aircraft equipped with a filter comprising a filter granulate according to the invention.

Many means of transport, more particularly aircraft and, for example, high-speed trains, are generally constructed pressure-tightly and artificially ventilated. Aircraft have a pressurized cabin, in which a cabin pressure lying above the external air pressure is set up at the flight altitude.

The supply of air to a pressurized cabin is generally carried out both by recirculating and purifying cabin air and by adding fresh air supplied from outside. Since the external pressure at the flight altitude is less than the cabin pressure, the fresh air to be supplied needs to be compressed. For the fresh air supply, in general, a part of the air flow from the compressor of one or more aircraft engines (so-called bleed air) is diverted, cooled to a desired temperature level and mixed with the cabin air.

The bleed air of jet engines may be contaminated with oil residues or oil mists, particularly when, for example, lubricating oil of the engine emerges in the region of the shaft, or the like, and is entrained by the compressor air flow. The oils of jet engines may contain constituents or additives which are harmful so humans, for example tricresyl phosphate (TCP). Entrained oil residues may furthermore lead to an unpleasant oil smell in the aircraft cabin. Recirculated cabin air may likewise contain odoriferous or harmful substances.

In the prior art, it is therefore already known to provide filter systems for the bleed air of engines and/or recirculated cabin air. On the one hand, for example, active carbon filters are known from public prior use. They have only a relatively low absorption capacity and bind harmful substances reversibly by physisorption, and therefore these may also be released again when an active carbon filter is loaded quite heavily.

It is furthermore known to remove undesired constituents from the cabin air by catalytic oxidation (for example US 2003/0188850 A1, US 2009/0227195 A1, US 2010/0158775 A1 and US 2005/0053515 A1). Such catalytic systems are very elaborate to install and operate, since operating conditions which permit catalytic oxidation of the harmful substances must constantly be maintained, for example temperatures of more than 200° C. for thermal catalysis or delivery of UV radiation for photocatalysis.

It is an object of the invention to provide a possibility, which is simple to handle and effective, for removing harmful substances, for example oil residues, from a gas flow, in particular the bleed air or cabin air of aircraft.

This object is achieved by a filter granulate for binding constituents of a gas flow, comprising filter particles which have the following components:
 a. a component for the physisorption of constituents,
 b. a component for the chemisorption of constituents,
 c. a component for the dissolving of oil constituents.

The invention furthermore relates to a filter nonwoven comprising a granulate according to the invention, to the use of such a granulate or nonwoven for filtering the breathing air in means of transport, more particularly aircraft, and to aircraft which are equipped with filters comprising a granulate or nonwoven according to the invention.

Some of the terms used in the scope of the invention will be explained first.

The term granulate refers to a granular pourable material. A filter granulate has suitability for use in a filter for a gas flow, as described in more detail below. The individual constituents of the filter granulate are filter particles.

According to the invention, the filter granulate contains filter particles which simultaneously have three components. The term component is in this context to be understood functionally, and means parts or constituents of a particle which can fulfill the described function.

A first component is used for physisorption of constituents of the gas flow. During physisorption, an absorbed molecule is bound to the surface of the component (of the physisorbing substrate) by generally comparatively weak physical forces (binding energies often in the range of 4-40 kj/mol). Physisorption generally leads to no chemical modification of the absorbed substances, and is usually reversible.

A further component is used for chemisorption of constituents of the gas flow. During chemisorption, the absorbate (the bound constituent of the gas flow) and/or the absorbent (the component which forms the substrate for the chemisorption) is chemically modified. Binding energies may, for example, lie in the range of around 800 kJ/mol. Chemisorption is generally irreversible, i.e. the chemisorbed constituents are permanently bound.

According to the invention, a third component is used for dissolving oil constituents. The term oil constituents refers to constituents entrained in the gas flow, for example constituents of the lubricating oil of a jet engine, such oil constituents generally being present as an aerosol finely distributed in the gas flow. Said component contains a solvent, which can transfer oil constituents into solution and therefore remove them from the gas flow. The vapor pressure of the solvent, and of the oil constituent solution resulting therefrom, is according to the invention preferably so low that the solvent and/or solution do not enter into the gas flow to a significant extent under the operating conditions of the corresponding filter. The ionic liquids described in more detail below are particularly preferred as solvent.

The filter granulate according to the invention thus combines three components, and therefore also three functions. According to the invention, the physisorption component may, for example, be selected from the group consisting of active carbon, siliceous earths, zeolites and bentonite, and leads to rapid and effective depletion of the gas flow constituents compatible with physisorption, for example harmful airborne substances, odors or the like.

The chemisorbing component allows permanent and therefore irreversible binding of corresponding undesired constituents of the gas flow. In the scope of the invention, it is also possible for constituents of the gas flow first to be physisorbed, and therefore localized in the region of the filter granulate, and subsequently for chemisorption and therefore permanent binding to take place.

The component for dissolving oil constituents allows permanent and reliable removal of corresponding oil aerosols from a gas flow, and will therefore effectively prevent the entry of undesirable oil odors and harmful substances from lubricating oil into the cabin air of the aircraft. The removal of these oil constituents by dissolving in a solvent permanently binds the oil constituents and furthermore has a high take-up capacity.

The filter granulate according to the invention therefore allows reliable and rapid, but also permanent and irreversible, removal of typical odoriferous and harmful substance constituents from a gas flow, in particular the breathing air of an aircraft cabin.

According to the invention, the chemisorption component may contain suitable amino acids or amino acid sequences, in particular peptides or proteins. Peptides generally have shorter chains than proteins; the transition between the two terminological categories is fluid. Such peptides or proteins can bind, by chemisorption, harmful substances which are so-called protein-reactive substances, i.e. compounds which react and form a chemical bond with proteins or protein derivatives of the chemisorption component. These include typical harmful airborne substances such as aldehydes (in particular formaldehyde) and many volatile organic compounds (VOC). Suitable amino acid sequences can be produced for example by hydrolysis of proteins, for example scleroproteins; furthermore, keratin-containing fibers may for example be used, for example sheep wool fibers.

According to the invention, the component for dissolving oil constituents preferably contains ionic liquids. Ionic liquids are salts which are generally liquid at the operating temperatures of the filter. Typically, ionic liquids are liquid at temperatures below 100° C., and preferably also at room temperature. Ionic liquids have a very low, scarcely measurable vapor pressure, and possess good dissolving properties for oil constituents.

Preferably, in ionic liquids according to the invention, the cations are selected from the group consisting of optionally alkylated imidazolium, pyridinium, pyrrolidinium, guanidinium, uronium, thiouronium, piperidinium, morpholinium, ammonium and phosphonium ions, and the anions are selected from the group consisting of tetrafluoroborates, trifluoracetates, triflates, hexafluorophosphates, phosphinates, tosylates, imides, amides, sulfates and halides.

In an advantaoeous embodiment of the invention, the particles of the filter oranulate have a matrix. The term matrix refers to a substance which acts as a structurer of the particles and carries the described components. Constituents of the matrix may comprise physisorption and/or chemisorption components. The matrix may furthermore contain binders, for example binders selected from the group consisting of mannuronic salts, guluronic salts, alginate salts and pectinic salts. These binders may for example first be provided as alkali metal salts in aqueous solution and mixed with further components. By replacement of the alkali metal ions, for example with alkaline-earth metal ions, the soluble salts can be converted into insoluble salts, which therefore precipitate or gel and thus produce corresponding particles. For example, drops of the aqueous solution may be introduced in an aqueous or alkaline calcium chloride solution, so as to rapidly cause the production. of insoluble alkaline-earth metal salts.

Such a matrix comprising the aforementioned binders may also enclose, or encapsulate, ionic liquids. The encapsulation of oils in a matrix of an alkali metal alginate is described, for example, in U.S. Pat. No. 4,389,419. This document is incorporated by reference into the subject-matter of the present disclosure.

The average particle diameter of the particles of a filter granulate according to the invention may preferably lie between 100 μm and 5 mm. Preferred size ranges are from 200 μm to 3 mm, more preferably from 500 μm to 2 mm.

The invention furthermore relates to a filter nonwoven which is equipped with a filter granulate according to the invention.

The invention furthermore relates to the use of a filter granulate and/or filter nonwoven according to the invention for filtering the breathing air in means of transport, more particularly aircraft. According to the invention, the filtering of bleed air may be carried out before the latter is delivered for the first time to the environmental control system of the cabin, in order to remove oil residues or other harmful substances originating from the compressor tract of the engine. As an alternative or in addition, recirculated cabin air may be filtered so as also to remove such harmful airborne substances, odors or the like.

The invention furthermore relates to a filter for filtering the breathing air in means of transport, more particularly aircraft, which has a filter granulate according to the invention and/or a filter nonwoven. The filter granulate and filter nonwoven may be provided in a sandwich-like arrangement.

The invention furthermore relates to an aircraft which contains at least one filter comprising a filter granulate and/or filter nonwoven according to thenvention. The filters may be used for purifying bleed air or recirculated cabin air, and may be arranged at one or more of the following installation sites:

between the bleed-air valve and the cooling unit,
between the cooling unit and the mixing unit,
between the mixing unit and the outlet of the supply ducts in the cabin and/or cockpit.

The terms used will be explained below in connection with the exemplary embodiment. Arrangement inside the pressurized cabin, before the outlet of the supply ducts in the cabin and/or cockpit, is preferred. Exemplary embodiments of the invention will be described below.

BRIEF DESCRIPTION OF THE DRAWING

The FIGURE schematically shows the environmental control system of an airliner.

The production of a granulate according to the invention will be described below.

The following constituents are dissolved, or dispersed, in 900 ml of water:

90 g bentonite
45 g of active carbon
35 g of ethylmethylimidazolium ethyl sulfate
5 g of N-(L-α-aspartyl)-L-phenylalanine methyl ester
6 g of sodium alginate.

The solution or dispersion produced in this way is introduced dropwise by means of a suitable nozzle device into a two percent strength aqueous calcium chloride solution. The addition of calcium (or other suitable polyvalent metal cations) leads to insoluble alginate salts, which cause the drops introduced through the nozzle to gel and solidify. The solidified particles are washed with water and dried in an air flow.

The average particle size of the granulate produced in this way is of the order of 2 mm, depending on the setting of the nozzle device.

An absorption filter or a filter nonwoven can be produced from the filter granulate obtained in this way.

In order to produce an absorption filter, a cylinder is first produced from a suitable screening fabric having a mesh width smaller than the average particle size of the granulate (for example a mesh width of 1 mm). A metal or a plastic screening fabric may be used. The cylinder is filled with the filter granulate, in which case individual layers may optionally be spatially separated from one another by screening fabric. The filled cylinder is closed on its end sides with screening fabric, and can be integrated as an absorption filter into the environmental control and ventilation system of the aircraft.

In order to produce a nonwoven material, one option is to spread in the granulate directly during production of the nonwoven. As an alternative, in the case of a completed nonwoven material, the particles may be spread in between two nonwoven layers, and the nonwoven layers may be adhesively bonded to one another or fixed relative to one another in another way.

The FIGURE schematically shows the environmental control system of an airliner. A cabin 4 and a cockpit 5 of an aircraft are fed with air by supply ducts 6. This air is a mixture of thermally regulated fresh air and filtered recirculated cabin air.

The fresh air is provided by diverting so-called bleed air from the compressor of one or more engines 7. The major part of the bleed air, which is heated owing to the compression (temperature typically 215-260° C.), is delivered to a cooling unit 8 and cooled to the desired temperature. The cooled air flow is delivered to a mixing unit 9.

Spent cabin air is sucked out from the cabin by means of a line 10 and purified in a device 11 for recirculating and filtering the cabin air. This device 11 operates according to the prior art. Purified recirculated cabin air and cooled fresh air are mixed in a predetermined ratio in the mixing unit 9, and are delivered to the cockpit and the cabin via the supply ducts 6. In order to regulate the temperature in the cabin, a part of the hot, not yet cooled bleed air may be diverted via the line 12 and mixed with the air flow sent from the mixing unit 9 to the cockpit 5 and the cabin 4.

The filter according to the invention may be installed in such an environmental control system at various positions, which are denoted by the references 1, 2 and 3 in The FIGURE.

In the case of installation site 1, the still hot bleed air is filtered directly after it is extracted from the engine 7. This installation site has the advantage that any oil residues present in the bleed air are filtered immediately after exit from the engine and cannot reach the environmental control system. Disadvantages with this location are, in particular, the operating conditions made more demanding by high temperature, high flow rate and high pressure, which make efficient operation of a filter according to the invention more difficult.

In the case of the possible installation site 2, the already cooled bleed air on the one hand, and the hot part of the bleed air diverted for the purpose of temperature regulation on the other hand, are purified respectively by means of at least one filter according to the invention. A problem in this case is particularly the fact that two air flows, in particular at very different temperatures, have to be filtered.

It is preferable to provide filters according to the invention at installation site 3, and to filter the already thermally regulated air immediately before it is delivered to the cockpit 5, or the cabin 4.

This installation site 3 has various advantages. At this installation site, comparatively cooler air with less varying temperature flows through the filters. The temperature of the air flow at installation site 3 is in any event less than 100° C. and therefore allows comparatively simple design of the filter because it is not necessarily heat-resistant. The cross section of the supply ducts 6 is generally large (typical diameter, for example, 150-164 mm), which allows a correspondingly large and therefore effective cross section of the filter, through which air that is only slightly compressed furthermore flows with a low flow rate. Installation site 3 furthermore is readily accessible for maintenance purposes, since it is located inside the pressurized cabin, and for example access through corresponding openings in the forward cargo area of an aircraft is possible. The number of required installation sites 3 may vary depending on the aircraft type. In the case of a commercial airliner of the A320 family, for example, five filters are required, while three filters are required for a Boeing 737.

The invention claimed is:

1. A filter granulate for binding constituents of a gas flow, said filter granulate comprising filter particles that have the following components:
   a) a component for the physisorption of constituents,
   b) a component for the chemisorption of constituents,
   c) a component for the dissolving of oil constituents wherein said filter granulate has an average particle diameter of from 100 µm to 5 mm.

2. The filter granulate of claim 1, wherein the physisorption component is selected from the group consisting of active carbon, bentonite, siliceous earths and zeolites.

3. The filter granulate of claim 1 wherein the chemisorption component contains peptides or proteins.

4. The filter granulate of claim 3, wherein the chemisorption component contains keratin-containing fibers.

5. The filter granulate of claim 1, wherein the component for dissolving oil constituents contains ionic liquids.

6. The filter granulate of claim 5, wherein the ionic liquids contain cations selected from the group consisting of optionally alkylated imidazolium, pyridinium, pyrrolidinium, guanidinium, uronium, thiouronium, piperidinium, morpholinium, ammonium and phosphonium ions, and anions selected from the group consisting of tetrafluoroborates, trifluoracetates, triflates, hexafluorophosphates, phosphinates, tosylates, imides, amides, sulfates and halides.

7. The filter granulate of claim 1, wherein said filter granulate has a matrix, wherein constituents of the matrix comprise physisorption components and/or chemisorption components.

8. The filter granulate of claim 7, wherein the matrix contains binders.

9. The filter granulate of claim 8, wherein the binders are selected from the group consisting of mannuronic salts, guluronic salts, alginate salts and pectinic salts.

10. The filter granulate of claim 1, wherein the filter granulate has a matrix, wherein said matrix encloses ionic liquids.

11. A filter nonwoven, said filter nonwoven comprising a filter granulate according to claim 1.

12. A method of treating breathing air in a means of transport comprising:
   filtering said breathing air using a filter granulate according to claim 1 and/or a filter nonwoven comprising a filter granulate according to claim 1.

13. A method of treating breathing air in an aircraft, comprising:
   filtering bleed air from a compressor of an aircraft engine using a filter granulate according to claim 1 and/or a filter nonwoven comprising a filter granulate according to claim 1.

14. A filter for filtering the breathing air in means of transport, wherein said filter has a filter granulate according to claim 1 and/or a filter nonwoven comprising a filter granulate according to claim 1.

15. The filter of claim 14, wherein the filter granulate and filter nonwoven are provided in a sandwich-like arrangement.

16. An aircraft, said aircraft having at least one filter according to claim 14 for filtering the breathing air.

17. The aircraft of claim 16, said aircraft comprising a bleed-air valve, a cooling unit, a mixing unit, and supply ducts having outlets in a cabin and/or a cockpit, wherein said at least one filter is arranged at one or more of the following installation sites:
  between the bleed-air valve and the cooling unit,
  between the cooling unit and the mixing unit,
  between the mixing unit and the outlet of the supply ducts in the cabin and/or cockpit.

18. The aircraft of claim 17, wherein said aircraft comprises a pressurized cabin, and wherein said at least one filter is arranged inside the pressurized cabin, before the outlet of the supply ducts in the cabin and/or cockpit.

19. The method of claim 12, wherein said means of transport is an aircraft.

20. The filter of claim 14, wherein said means of transport is an aircraft.

* * * * *